Feb. 13, 1923.
A. T. POTTER.
WINDSHIELD.
FILED MAR. 26, 1921.
1,444,885.
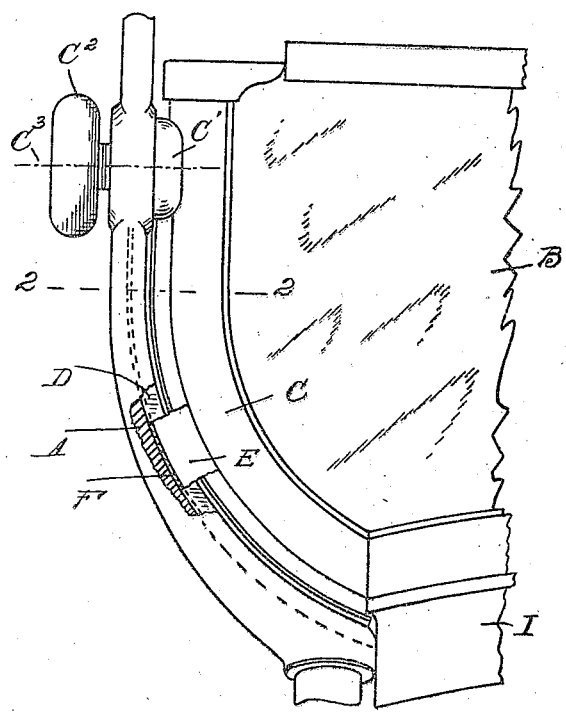
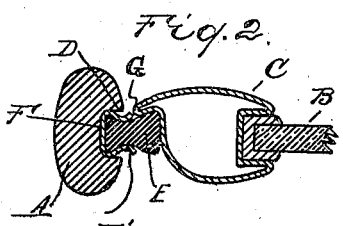
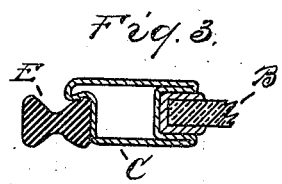
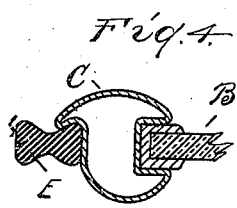
Inventor
Albert T. Potter
By Whittemore, Hulbert, Whittemore and Belknap
Attorneys Patented Feb. 13, 1923.

1,444,885

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD.

Application filed March 26, 1921. Serial No. 455,818.

*To all whom it may concern:*

Be it known that I, ALBERT T. POTTER, a citizen of the United States of America, residing at Detroit, in the county of Wayne and State of Michigan, have invented certain new and useful Improvements in Windshields, of which the following is a specification, reference being had therein to the accompanying drawings.

This invention relates to windshields and more particularly to pivotally adjustable windshields.

The invention consists in the provision of a novel weather seal between the pivotal windshield and the stationary parts such as the standards or other supporting elements and the cowl or dash to which the windshield is close adjacent in its normal upright position.

In the drawings:

Figure 1 is a front view of a side portion of a windshield showing a supporting standard and a portion of the cowl and dash, the herein described weather sealing means being shown associated with said parts;

Figure 2 is a cross section on line 2—2 of Figure 1;

Figures 3, 4 and 5 are similar cross section views showing the improved weather seal applied to windshield frames of various tubular cross sections.

In these views the reference character A designates a windshield standard, B the glass of a windshield, and C the tubular frame for said glass. As is common said windshield is pivotally mounted upon the standard A, C' indicating the pivot forming member, C² the clamping screw, and C³ the pivotal axis. The interior face of the standard A is formed with a longitudinally extended channel D, and within said channel there is retained an elongated weather strip E formed of rubber or similar yieldable material. The preferred retaining means for said strip is a spring clip F of approximately U-shaped cross-section, said strip being secured within the channel D co-extensively with said channel. The opposite walls of said clip preferably incline toward each other so as to form a pocket into which an enlarged inner end portion of the weather strip E may be forced and firmly gripped, the edge portions of said walls being divergently flared as indicated at F' to facilitate introducing said enlarged portion of the strip E into the clip. The outer portion of the strip E is likewise enlarged and is engageable by a flange G formed on the windshield frame C, said flange being concaved to conform to the convex enlarged outer portion of the strip E. By thus enlarging the outer portion of the strip E, particularly in the direction of the flange G, there results a tendency of the strip to wedge between the standard A and frame C when said enlarged portion is under a bending stress due to engagement by said flange, and consequently a more positive weather seal is insured. Preferably the flange G is formed by a folded or return bent portion of the frame C so that there is a double thickness of metal contributing to the strength of said flange.

When the windshield member comprising the glass B and frame C is in its normal upright position, the flange G seats snugly against the weather strip E so as to establish a tight seal such as will prevent the passage of wind or moisture.

The described sealing means may be also employed between the bottom member of the frame C and the cowl or dash which is indicated at I.

What I claim as my invention is:

1. In a windshield, the combination with a pivotal frame provided with a concaved flange, of a stationary frame with which said pivotal frame registers in its normal position, said stationary frame being formed with a longitudinal channel, a spring clip secured in said channel, and a yieldable weather strip retained in said clip and having a convexed enlargement at one edge engaged by the pivotal frame and said flange in its normal position.

2. In a windshield, the combination with a pivotal frame, of a stationary frame member, to which the pivotal frame is adjacent in its normal position, a yieldable weather strip longitudinally extended upon one of said members, the other member being formed with a shoulder engageable with said strip, one portion of said strip being engaged by the pivotal frame, another portion of said strip being enlarged toward said shoulder to produce a compressive stress in said strip as the result of the bending effort exerted by said shoulder upon the strip.

3. In a windshield construction, the combination with a pivotal windshield frame provided with a concaved flange, of a stationary frame with which said pivotal frame registers in its normal position, a spring clip longitudinally extended upon said stationary frame, and a yieldable weather strip retained in said clip and having a convexed enlargement engaged by the flange of said pivotal frame in its normal position, the opposite walls of said clip being inclined toward each other about said strip, and the edge portions of said walls being divergently flared adjacent to the convexed enlargement of said strip.

4. In a windshield construction, the combination with a movable windshield frame, of a flange formed upon said frame, a stationary frame having a channel formed therein, a removable spring clip engaging said channel, the opposite walls of said clip being inclined to form a pocket, the edge portions of said walls being divergently flared, a resilient strip engaging said pocket and provided with a groove, one side of said groove being engageable with said flange and the outer edge of said strip being engageable with said movable frame.

In testimony whereof I affix my signature.

ALBERT T. POTTER.